P. C. BRENNER.
FILM WINDING MECHANISM.
APPLICATION FILED AUG. 5, 1913.
1,104,616.
Patented July 21, 1914.
3 SHEETS—SHEET 1.
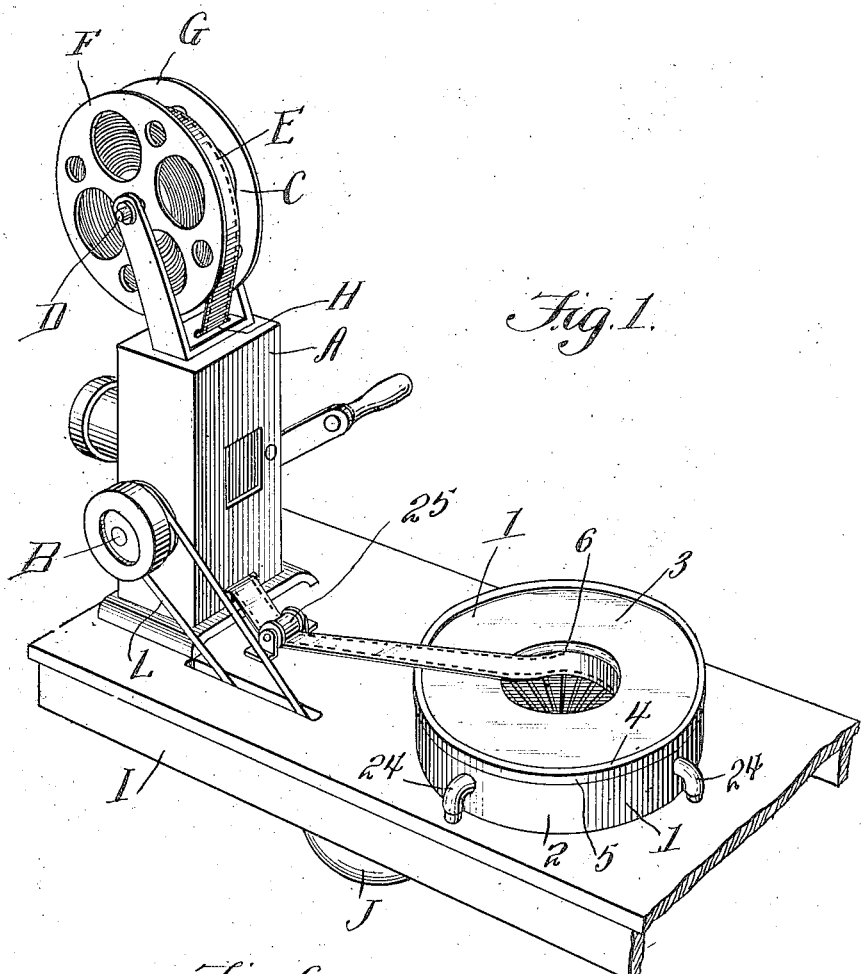
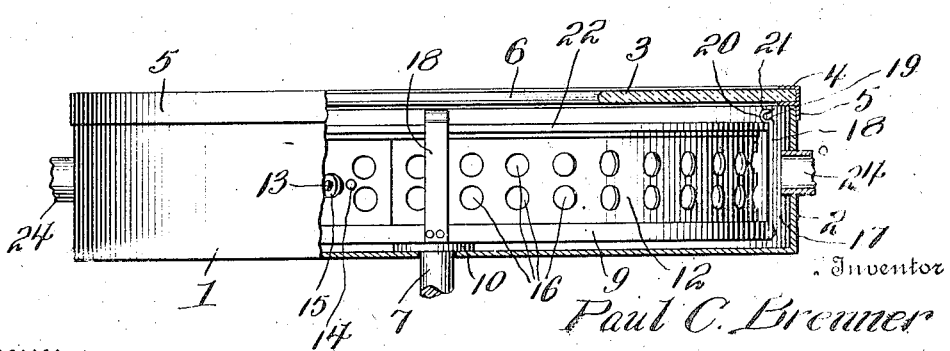
Witnesses
J. L. Wright
James A. Kochl
Inventor
Paul C. Brenner
By Victor J. Evans
Attorney

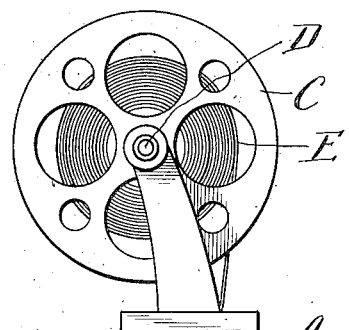
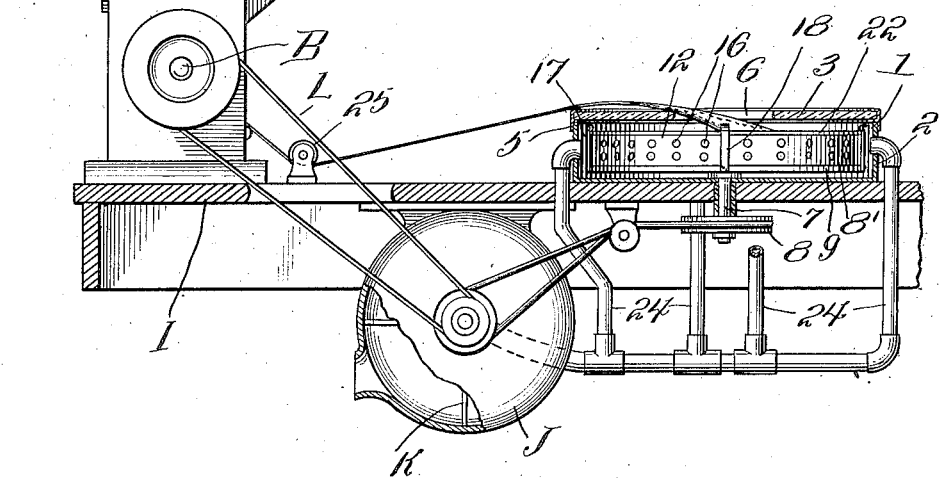
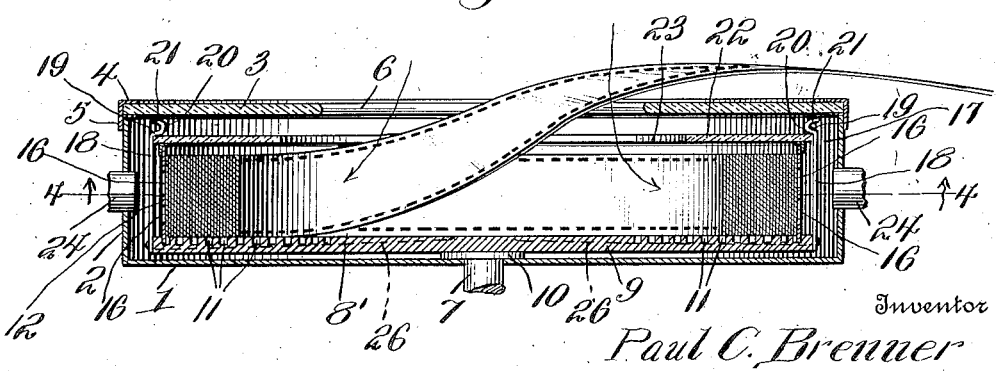

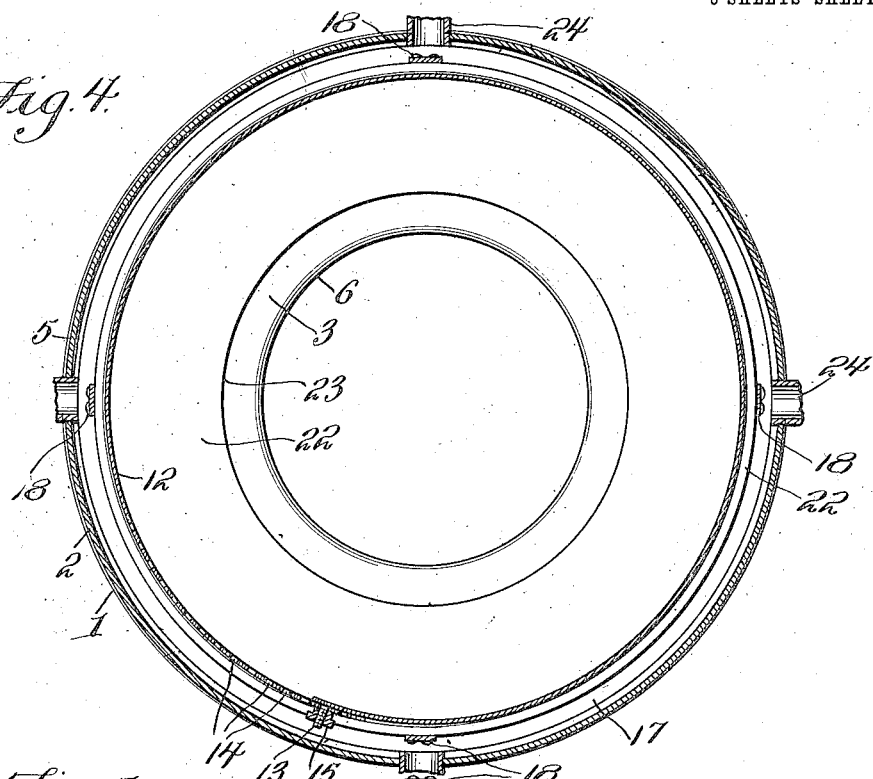
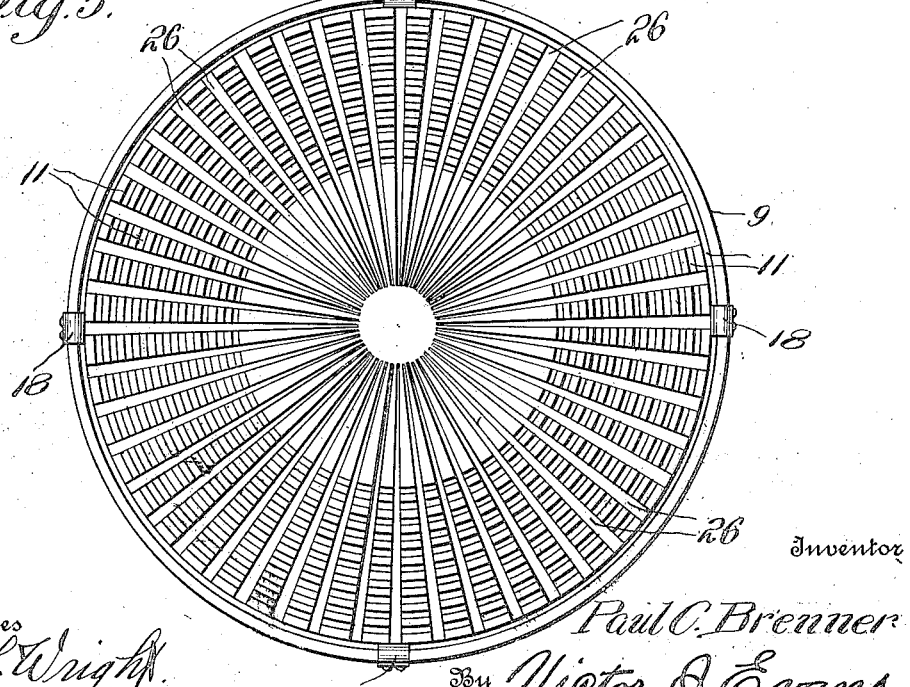

UNITED STATES PATENT OFFICE.

PAUL C. BRENNER, OF CHICAGO, ILLINOIS.

FILM-WINDING MECHANISM.

1,104,616.

Specification of Letters Patent.

Patented July 21, 1914.

Application filed August 5, 1913. Serial No. 783,103.

*To all whom it may concern:*

Be it known that I, PAUL C. BRENNER, a citizen of the United States, residing at Chicago, in the county of Cook and State of Illinois, have invented new and useful Improvements in Film-Winding Mechanism, of which the following is a specification.

This invention relates to film winding mechanism for motion picture apparatus; and it has for its primary object the provision of means for winding the film from the delivering magazine to the receiving magazine in such manner that the front end of the film will be always arranged outermost so that the complete coil of film can be taken from the receiving magazine and operatively arranged in the delivering magazine for an immediate reëxhibition and ing injury to the film during the winding of the film.

Another object of the invention is the provision of film winding mechanism wherein the film on its delivery to the winding or receiving magazine may be initially drawn by induced suction to a position to permit of an accurate rewinding of the film.

Another object of the invention is the provision of film winding mechanism which will be constructed with a view to eliminating injury to the film during the rewinding operation.

A further object of the invention is the provision of a receiving magazine which will include a revolving driven tray and means for operating the tray directly through the controlling mechanism of the picture exhibiting machine whereby to necessitate an immediate stoppage of the tray when the picture exhibiting machine is thrown out of operation, such as at the time of a break in the film.

Another object of the invention is the provision of a receiving tray which will be adjustable so as to accommodate itself to films of different lengths.

A still further object of the invention is the provision of means for facilitating the operation of removing the rewound film from the receiving tray.

With these and other objects in view, the invention consists of certain novel features of construction, combination and arrangement of parts, as will be hereinafter described and claimed.

In the accompanying drawings:—Figure 1 is a perspective view of a moving picture exhibiting machine including a supporting platform therefor and illustrating the coöperative association of the receiving magazine with the delivering magazine; Fig. 2 is a vertical longitudinal section therethrough; Fig. 3 is a vertical section on an enlarged scale through the receiving magazine; Fig. 4 is a horizontal section, taken on the line 4—4 of Fig. 3; Fig. 5 is a top plan view of the winding tray of the receiving magazine; and Fig. 6 is a side view of the receiving magazine, showing the outer casing partly removed and exposing the perforated walls of the rewinding tray.

The picture exhibiting machine shown conventionally herein at A may be of the usual well known type, and is shown to include a driven shaft B for operating the machine to draw the film intermittently over the framing or exhibiting opening in the usual manner. The delivering magazine C is preferably mounted vertically upon the machine A, and it is provided with a driven spindle D, on which is mounted a reel E consisting of separable sections F and G whereby to facilitate the operation of applying the roll or coil of film prior to the display of the pictures.

The exhibiting machine A is mounted on a platform I and supported from beneath the platform is a fan casing J having a revolubly mounted fan K therein for a purpose to be hereinafter explained. The supporting shaft of the fan is connected by means of a belt L with the driven shaft of the picture exhibiting machine, so as to be directly driven thereby when the machine is in operation and to be instantly stopped when the machine is thrown out of operation.

The receiving magazine comprises a casing 1 mounted upon the platform I and at right angles to the axis of the delivering magazine of the picture exhibiting machine. This casing is provided with annular vertically rising walls 2, to which is removably fitted a transparent cover 3 of plate-glass, said cover having an annular metal rim 4, which is provided with a depending flange 5 which embraces the vertical walls 2 of the casing 1 when the cover is applied. At the center the cover is provided with a relatively large guide opening 6. The platform 1 supports a driving shaft 7 which is connected at 8 with the picture exhibiting machine so that when the latter is in operation, power will be transmitted to the shaft for a purpose to be hereinafter explained. The receiving tray 8' comprises a horizontal bottom 9 secured at its center to the shaft 7, a spacing washer 10 being interposed between the bottom of the casing 1 and the bottom 9 of the tray 8', so as to hold the bottom 9 out of frictional contact with the bottom of the casing. This tray is provided with concentric continuous grooves 11 for interchangeably accommodating the side walls 12 of the tray. The walls 12 of the tray are constructed from a single strip of sheet metal, one terminal of the strip being provided with lugs 13, which are adapted to be extended through receiving passages 14 in the other end of the strip according to the adjustment desired to a proper accommodation of a film of a prescribed length. Clamping nuts 15 are associated with the studs 13, and are adapted to hold the adjacent terminals of the wall forming strip properly connected with each other. The walls 12 are provided with perforations 16, which open into the film receiving space of the tray and which open also into the annular space 17 between the tray and the vertical walls 2 of the casing 1. The bottom 9 of the tray is provided at suitable intervals with vertically rising springs 18 having their upper ends extended beyond the upper edges of the tray 8' and then bent inwardly at 19 and then upwardly at 20 and then outwardly at 21 so as to form a retainer which is adapted to engage against the edge of a transparent cover 22, the latter being removably mounted upon the tray 8', as clearly shown in Fig. 3. The cover 22 is also constructed of plateglass and is provided with a relatively large opening 23 which is located directly beneath the opening 6 in the cover 3 of the casing 1. In order that suction may be created in the space 17 and in the tray 8 I connect the suction fan with the walls 2 of the casing 1 by branch pipes 24.

From the construction described, it is evident that the front end of the film, after being passed through the picture exhibiting machine may be extended over a suitable guide pulley 25 upon the platform I and then extended through the alined openings 6 and 23 and arranged in the tray 8, so that as soon as the exhibiting machine is set in operation the suction fan will be also operated and the air drawn from the outside in the direction of the arrows indicated in Fig. 3 and suction directly applied to the first terminal or front end of the film and to thereby automatically draw said front end into a proper winding position relatively of the outer walls of the revolving tray 8'. Simultaneously with this operation, the tray is also revolved and the film is drawn continuously from the delivering magazine of the picture exhibiting machine and wound in a compact manner and arranged so that it may be removed from the tray with facility and immediately placed back upon the reel of the picture exhibiting machine for further exhibition, as will be understood. In order to increase the application of the suction against the film the bottom 9 is preferably provided with a series of radially extending grooves 26, as shown.

While the apparatus is particularly designed for the use hereinbefore specified, it is to be understood that it may be used advantageously for winding ribbons, tapes, or the like.

The arrangement of the tray and the connection therewith of the surrounding casing is such that the first convolution of the film will be drawn in an outward direction and immediately against the walls of the casing where a vacuum is formed and said outer portion of the film held in a relatively fixed position. After this operation the air is drawn through the opening in the casing and through the opening in the tray and through induced suction to the other wound portions of the film are drawn outwardly and against the first portion, the air entering the radial grooves in the bottom of the tray so as to operate directly against the edges of the film as will be understood.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described my invention, what I claim is:—

1. The combination with a moving picture apparatus, of a revolving film receiver, means operated by the exhibiting apparatus for revolving the receiver, and means operated by the apparatus for inducing suction in the receiver radially of the axis thereof.

2. A revolving tray, means for conducting a film thereto and means for inducing movement of an air current within the tray to move the film to a predetermined position in the tray.

3. A revolving tray, means for conducting a film thereto, and means for inducing movement of an air current outward of the axis of the tray to effect a predetermined position of the film in the tray.

4. Film winding mechanism having a rotary tray, means for conducting the film to the tray, and means for inducing movement of an air current to draw the film laterally of the axis of the tray.

5. A revolving tape receiving tray, means for revolving the tray, means for feeding the tape to the tray, and means operated by the revolving means for creating an air current within the tray and against the tape so as to move the latter to a predetermined position within the tray.

6. A revolving tray, means for feeding a tape thereto, and means for creating an air current for moving the tape radially of the tray by suction induced in the tray.

7. In film winding mechanism, a revolving member having an aperture, means for feeding a film to the member, and means for creating an air current to draw the film against the member by suction created at the aperture of the member.

8. A film winding device comprising a revolving foraminated member, means for feeding the film to the member, means for revolving the member, and means controlled on operation of the revolving means for creating an air current for moving the film with relation to the axis of the member by induced suction.

9. Film winding mechanism comprising a revolving receiver for the film, means for feeding the film thereto and means to produce an air current within the receiver to move the film radially of the axis of the receiver.

In testimony whereof I affix my signature in presence of two witnesses.

PAUL C. BRENNER.

Witnesses:
   OTTO FETTING,
   I. W. FOLTZ.